June 7, 1960     J. E. KELLEY     2,939,593
LIQUID DUMPER
Filed April 15, 1958

INVENTOR.
JOHN E. KELLEY
BY Kimmel & Crowell
ATTORNEYS

United States Patent Office 2,939,593
Patented June 7, 1960

2,939,593
LIQUID DUMPER

John E. Kelley, Natick, Mass.
(21 Heldun St., West Roxbury 32, Mass.)

Filed Apr. 15, 1958, Ser. No. 728,621

1 Claim. (Cl. 214—314)

The present invention relates to liquid dumpers, and particuarly to devices for dumping liquid from cased returned beverage bottles.

The primary object of the invention is to provide an apparatus for supporting and maintaining returned beverage bottles in their case while inverting the bottles to dump the unused liquid therefrom.

Another object of the invention is to provide a liquid dumper of the class described above having means to direct the dumped liquid into floor drains.

A further object of the invention is to provide a liquid dumper of the class described above which is inexpensive to manufacture, simple to use, and which is portable being mounted on a wheeled frame.

Other objects and advantages will become apparent in the following specification when considered in the light of the attached drawings, in which.

Figure 1:
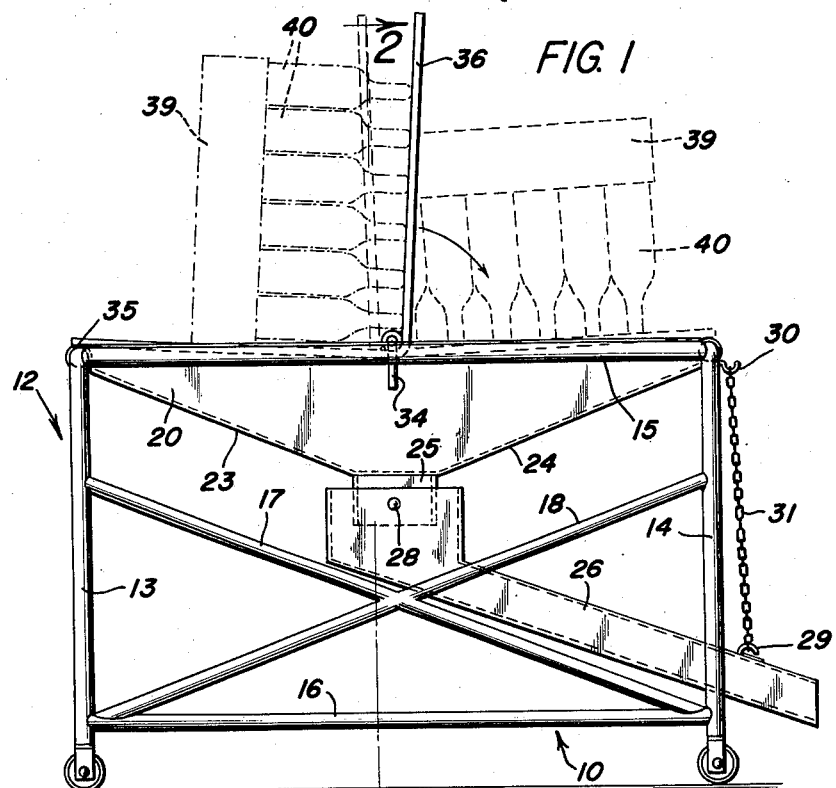
Figure 1 is a side elevation of the invention.

Referring now to the drawings in detail wherein like reference characters indicate like parts throughout the several figures, the reference numeral 10 indicates generally a liquid dumper constructed in accordance with the invention.

The liquid dumper 10 includes a pair of spaced parallel side frames 11, 12 each of which is provided with upright tubular corner posts 13, 14 connected at their upper ends by an upper rail 15, and at their lower ends by a lower rail 16. Crossed bracing bars 17, 18 rigidly brace the frames 11, 12 to provide a rigid structure. A wheel 19 is positioned beneath each corner of the dumper 10 and is secured to the lower end of the uprights 13, 14, as best shown in Figures 1 and 2.

Figures 2, 3:
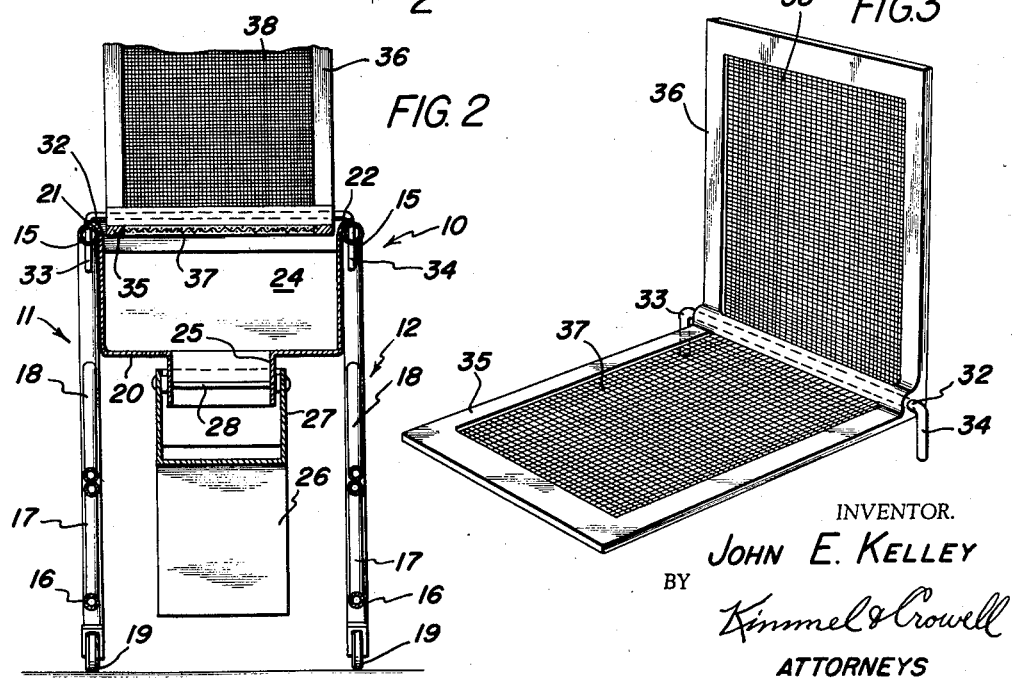
Figure 2 is a transverse section taken along the line 2—2 of Figure 1, looking in the direction of the arrows, and partly broken away for convenience of illustration.
Figure 3 is a perspective view of the dumping platform.

A generally rectangular dumping receptacle 20 is positioned between the side frames 11, 12 and is provided with outwardly extending oppositely disposed flanges 21, 22 which engage over the upper frame members 15, as shown in Figure 2. The receptacle 20 has downwardly sloping bottom walls 23, 24 which terminate in a spout 25 opening through the bottom thereof.

A closed chute 26 is positioned below the receptacle 20 and is provided with an enlarged upper end portion 27 encompassing the spout 25 and secured thereto by a pivot shaft 28. The opposite end of the chute 26 is provided with a hook 29 positioned on the upper end thereof. The pivot shaft 28 mounts the chute 26 for vertical swinging movement about the center of the shaft 28. A hook 30 is rigidly secured to the upright 14 and the outer end of the chute 26 is supported by a chain 31 having its opposite ends connected to the hooks 29, 30.

A transverse shaft 32 is provided with perpendicularly offset opposite ends 33, 34 and has a pair of perpendicularly related rectangular frames 35, 36 journalled thereon intermediate the depending offset ends 33, 34. The rectangular frames 35, 36 are provided with open mesh metallic screen panels 37, 38, respectively, for reasons to be assigned.

The offset end portions 33, 34 of the shaft 32 engage through openings in the frame members 15 to mount the frames 35, 36 in overlying relation to the receptacle 20 for pivotal movement from a position with the frame 35 generally horizontal to a position with the frame 36 generally horizontal, as indicated in dotted lines in Figure 1.

In the use and operation of the invention, a bottle crate 39 shown in dotted lines in Figure 1, having a plurality of returned bottles 40 positioned therein has one end thereof supported on the frame 35 and screen panel 37 with the tops of the bottles 40 engaging the frame 36 and screen panel 38. The frames 35, 36 are then pivoted about the shaft 32 so as to invert the bottles 40 to the position shown in dotted lines in Figure 1, to drain any remaining liquid from the bottles 40 into the receptacle 20 and through the chute 26 to a floor drain (not shown).

After the bottles 40 have been drained, the frames 35, 36 are pivoted back to a reverse position and the crate 39 is removed.

The chute 26 can be adjusted in height by raising and lowering the chain 31 to engage the chute 26 directly with a drain when in use and to hold it out of engagement with the floor when moving the receptacle dumper 10 from place to place.

Having thus described the preferred embodiment of the invention, it should be understood that numerous structural modifications and adaptations may be resorted to without departing from the scope of the appended claim.

What is claimed is:

A liquid dumping apparatus comprising a pair of spaced parallel rigid frame members, each comprised of upright tubular corner posts connected at their upper ends by an upper rail each upper rail having a vertical opening at its midpoint, and at their lower ends by a lower rail, a wheel rotatably mounted in the lower end of each upright corner post, a generally rectangular dumping receptacle positioned between the side frames, and including outwardly extending oppositely disposed flanges engaging over the upper frame members, downwardly sloping bottom walls in said receptacle, and a spout opening through the bottom, a closed chute having an enlarged upper end portion encompassing said spout, means pivotally securing said enlarged upper end portion to said spout, chain means secured to the opposite end of the chute for securing said chute in a selected position of vertical adjustment relative to said spout, a transverse shaft having perpendicularly offset end portions, said offset end portions engaging in said openings in said upper rails, a pair of rectangular frame members fixedly connected in right angled relation to each other journalled at their point of connection on said transverse shaft for pivotal movement thereabout, an open mesh metallic screen panel in each of said rectangular frames, means limiting movement of each frame to a horizontal position on top of said upper rails when the other frame is in vertical upright position, whereby a container to be dumped may be positioned with its open end against the vertical screen panel with its side resting on the horizontal screen panel and by swinging said pair of frames about said rod moved to upright inverted position with its open end supported over one end of said dumping receptacle for dumping the contents of the container through the horizontal screen panel.

References Cited in the file of this patent

UNITED STATES PATENTS

| | | |
|---|---|---|
| 1,373,521 | Neller | Apr. 5, 1921 |
| 1,373,604 | Dyer | Apr. 5, 1921 |
| 1,641,881 | DeLain | Sept. 6, 1927 |
| 1,710,588 | Nagy | Apr. 23, 1929 |
| 1,889,663 | Ilyus | Nov. 29, 1932 |
| 2,781,929 | Uhrich | Feb. 19, 1957 |